Sept. 29, 1959 C. E. McCORMICK Re. 24,706

GLARE SHIELD FOR CURVED WINDSHIELDS

Original Filed June 30, 1954 3 Sheets-Sheet 1

INVENTOR.
Charles E. McCormick
BY
Barnes, Kisselle, Laughlin & Raisch
Attorneys

GLARE SHIELD FOR CURVED WINDSHIELDS
Original Filed June 30, 1954 3 Sheets-Sheet 2
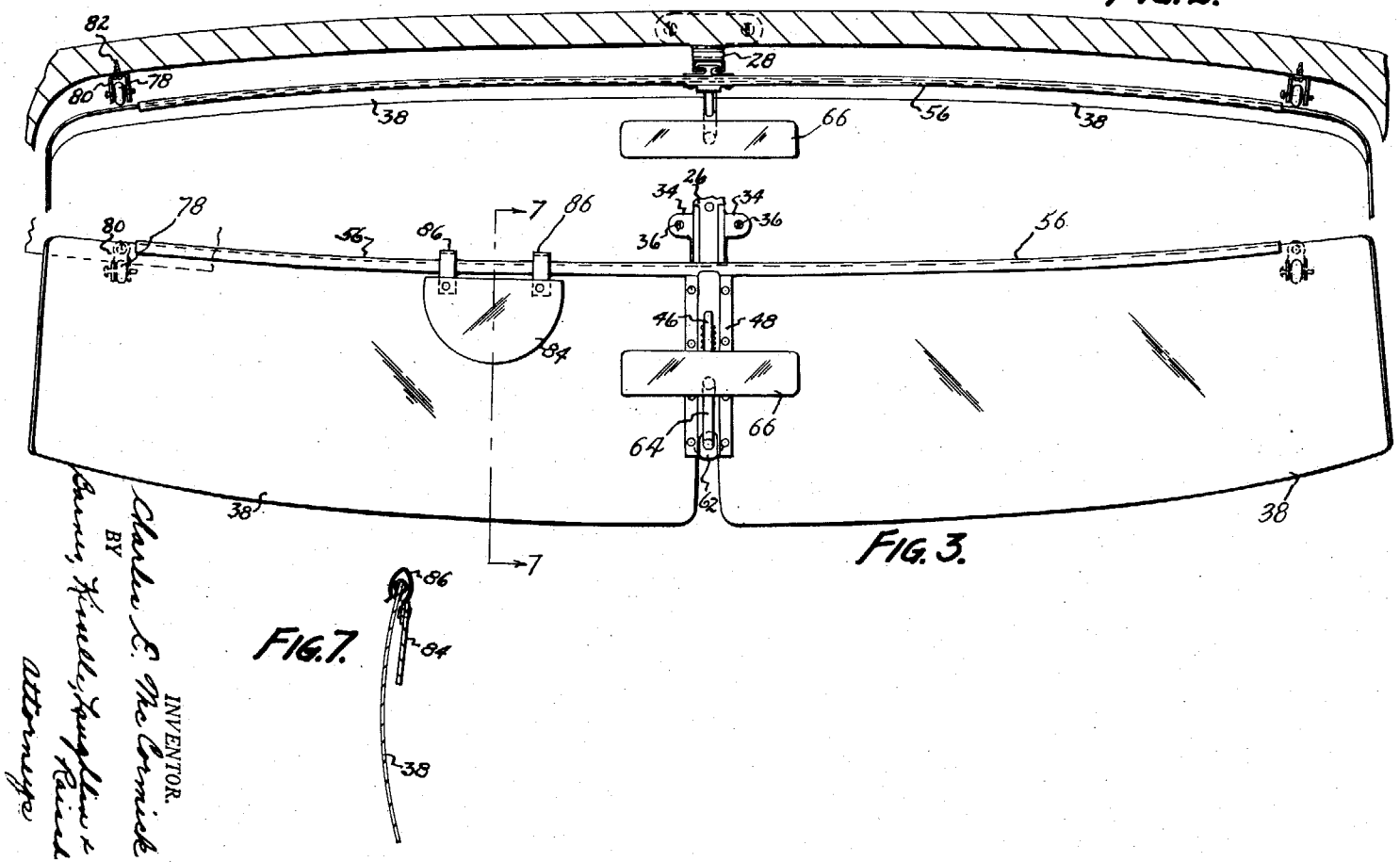
INVENTOR.
Charles E. McCormick
BY
Barnes, Kisselle, Raisch & Raised
attorneys GLARE SHIELD FOR CURVED WINDSHIELDS
Original Filed June 30, 1954 3 Sheets-Sheet 3
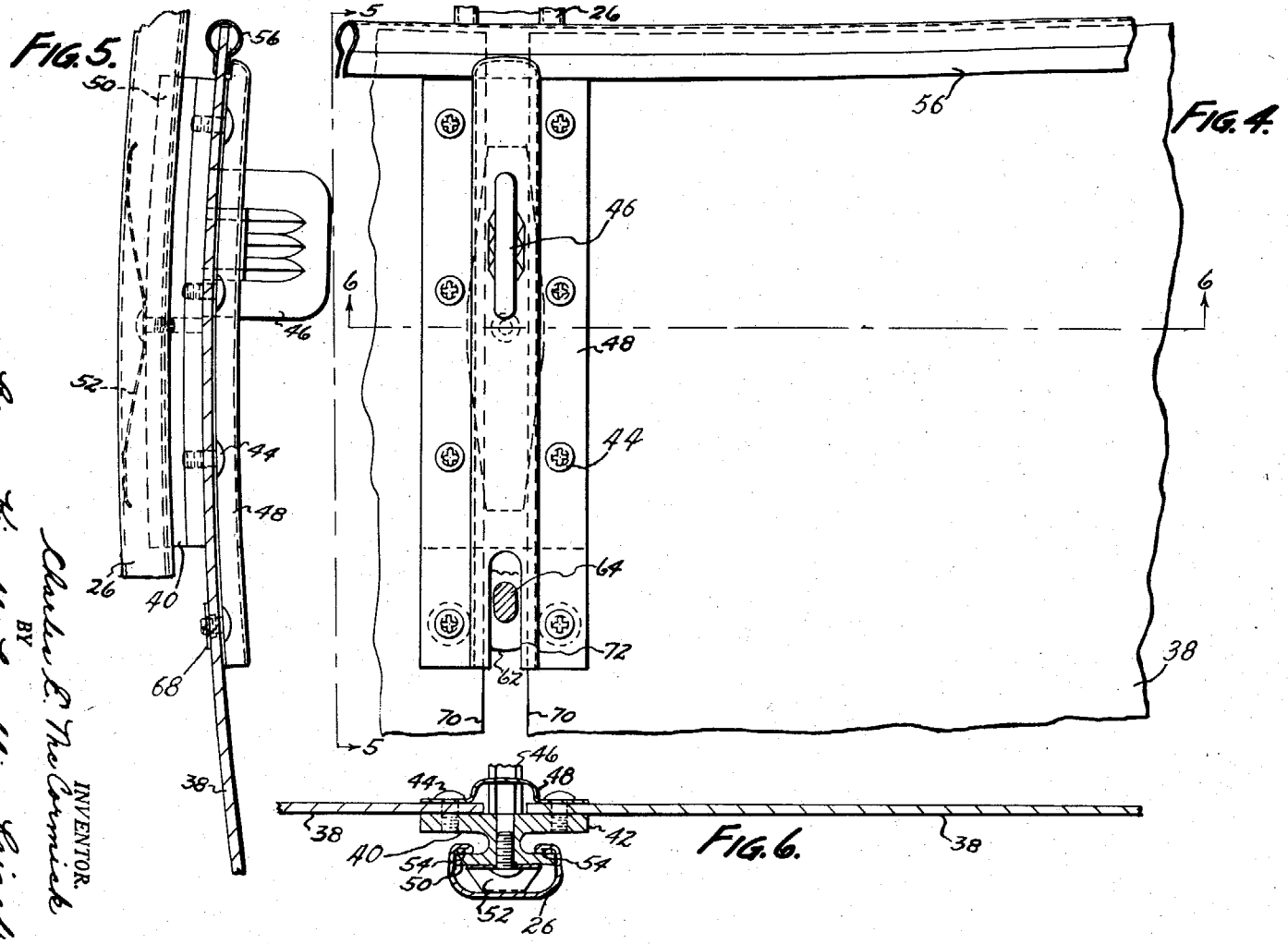
INVENTOR.
Charles E. McCormick
BY
Barnes, Kisselle, Laughlin & Raised
attorneys United States Patent Office Re. 24,706
Reissued Sept. 29, 1959

24,706

GLARE SHIELD FOR CURVED WINDSHIELDS

Charles E. McCormick, Dearborn, Mich.

Original No. 2,862,762, dated December 2, 1958, Serial No. 440,327, June 30, 1954. Application for reissue April 23, 1959, Serial No. 808,542

13 Claims. (Cl. 296—97)

Matter enclosed in heavy brackets [ ] appears in the original patent but forms no part of this reissue specification; matter printed in italics indicates the additions made by reissue.

This invention relates generally to glare shields and more specifically to adjustable, transparent glare shields for automobiles for protecting the eyes of the driver and passengers from strong sunlight or from the bright headlights of an oncoming car while permitting ample visibility for safe driving.

Heretofore, various types of transparent glare shields or sun visors have been made for protecting the eyes of the driver and passengers of an automobile from strong sunlight and the like. For example, it is sometimes the practice to tint the fixed windshield glass in its entirety. This solution is not entirely desirable because at certain times of the day, under poor light conditions, a diminution of light transmission through the windshield reduces the visual acuity of the driver to the point of poor visibility which is conducive to accidents. Experience has shown that in the case of a glare shield in the form of a transparent tinted panel, the panel should be capable of being readily adjustable by the driver while driving so that with poor light conditions, the glare shield may be entirely or partly removed from the windshield area and with strong or harsh light conditions, a glare shield may be easily adjusted to overlie a small or a large portion of the windshield area.

Glare shields of the conventional type, either opaque or transparent, are usually deficient in that they fail to shut out the strong sunlight entirely across the upper area of the windshield. Such visors or glare shields are usually provided in pairs, one at each side of the automobile. Since the rear view mirror is usually mounted in a position depending from the header across the upper edge of the windshield, such visors or glare shields terminate short of the vertical central line of the windshield to provide clearance for the rear view mirror. The shortcomings of conventional visors are even more apparent in the case of the newer type of windshields where the windshield glass is extended further around the ends to vertically disposed door pillars.

I am well aware of the fact that attempts have been made heretofore to satisfactorily solve this problem by providing tinted, transparent panels arranged to slide into and out of the windshield area; but such arrangements have usually been cumbersome, expensive and not easily interchangeable between cars of different makes and models.

It is an object of this invention to provide a glare shield construction wherein a tinted panel is arranged to be easily adjusted by the driver from an extreme lowered position where it shields substantially all of the upper half portion of the windshield to an extreme raised position where it is substantially entirely removed from the windshield area.

A further object of the invention resides in the provision of an adjustable glare shield of simple and economical construction which with minor alterations can be applied to cars of different makes and models.

A further object of the invention lies in the provision of a combination bracket to support both the rear view mirror and the glare shield, which bracket is mountable at the top center of the windshield opening.

In the drawings:

Fig. 2 is a sectional view taken along the line 2—2 in Fig. 1.

Fig. 3 is a fragmentary view of the glare shield and surrounding structure as seen in the direction of the arrow 3 in Fig. 1.

Fig. 4 is an enlarged fragmentary view of the glare shield as seen from the inner face thereof, or is a section at 4—4 of Fig. 1.

Fig. 5 is a sectional view taken along the line 5—5 in Fig. 4.

Fig. 6 is a sectional view taken along the line 6—6 in Fig. 4, and 6—6 in Fig. 1.

Fig. 7 is a sectional view taken along the line 7—7 in Fig. 3.

Figure 1:
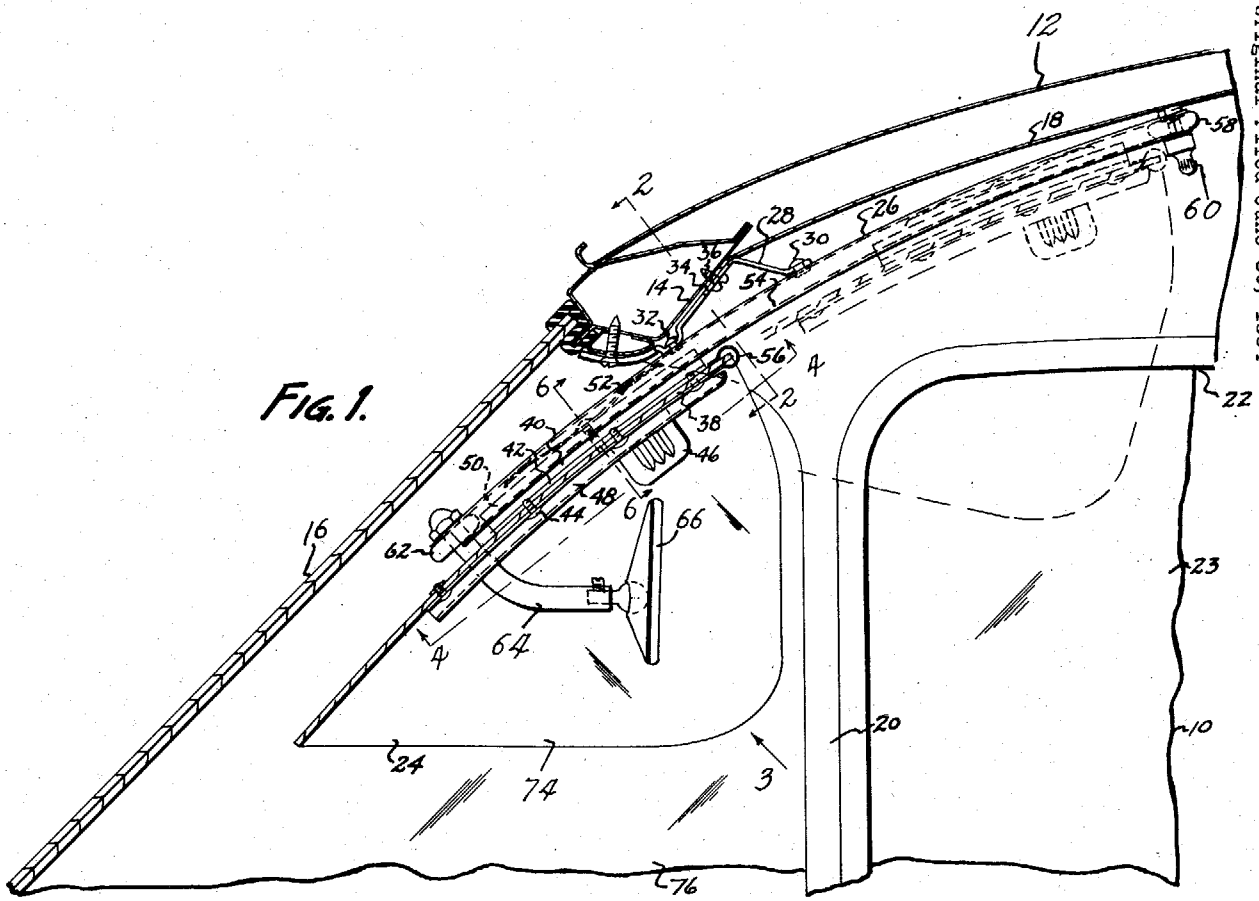
Fig. 1 is a fragmentary vertical sectional view slightly to the left of center of an automobile body, taken through a portion of the windshield header and roof and showing the glare shield construction of this invention.

Referring to the drawings and particularly to Fig. 1, there is shown an automobile body 10 having a roof panel 12 terminating at its forward edge in a windshield header 14 which defines the upper edge of an opening for a windshield glass 16. Within the automobile, the roof panel 12 is overlaid with a headlining 18. At each side of the body 10, there is provided a front pillar 20 for a door 22 provided with a glass panel 23. The windshield glass 16 extends across the front of the automobile and around each side to the pillar 20.

The glare shield construction of this invention includes the glare shield proper, generally designated 24, and a supporting track 26. Track 26 is channel shaped in cross section (Fig. 6) and is arcuate in a longitudinal direction. A bracket 28 is provided for mounting the glare shield within the automobile. Bracket 28 is riveted to the track as at 30 and 32 and is provided with an extended portion having a pair of lugs 34 designed to be mounted flat against the header 14 by metal screws 36 at the location where the conventional rear view mirror bracket is normally mounted. Track 26 may be of the same general configuration and size for most makes and models of automobiles, whereas bracket 28 will vary to accommodate track 26 to different groups of automobiles.

Glare shield 24 may comprise a single tinted transparent panel which extends entirely across the windshield, but it also may be fashioned as shown in the drawings as two separate panels 38 which are connected together along the adjacent central edges of the glare shield. The two panels 38 are interconnected by a carriage member 40 which is preferably molded from a plastic or resin such as Bakelite. The panels 38 are mounted on a supporting base portion 42 of member 40 by a plurality of screws 44. The carriage 40 is disposed on the outer side of panels 38. A handle portion 46 molded integrally with carriage 40 projects between the adjacent edges of panels 38. At the inner face of these panels, a cover plate 48 spans the adjacent edges of panels 38 and overlies the inner face portions thereof adjacent these edges. Handle 46 projects inwardly through cover plate 48. Screws 44 extend through cover plate 48 and panels 38 and thread into the base portion 42 of carriage 40. Carriage 40 is also molded with a shoe portion 50 arranged to slidably engage within track 26. A leaf spring 52 is provided for yieldably urging shoe 50 against the inturned flanges 54 of track 26. Along the upper edge of the glare shield, there is provided a generally channel shaped metal re-enforcing member 56. It will be observed particularly from Fig. 5 that the panels 38 are arcuate in vertical section with about the same radius as the track 26. Cover plate 48, carriage 40 and track 26 correspond with the curvature of panels 38.

Track 26 is mounted on header 14 by means of bracket 28 such that the upper portion of the track extends adjacent the headlining 18 and so that a lower portion of the track extends in a direction downwardly from the header 14 into the area of the windshield opening. At the upper end of track 26, there is provided a stop 58 which is removably mounted on the track by means of thumb screw 60. If stop 58 and thumb screw 60 are removed, then the carriage and entire glare shield assembly may be removed from engagement with track 26, for the purpose of washing and cleaning. A stop 62 is also provided at the lower end of track 26. Stop 62 includes an arm 64 which projects inwardly from the track 26. The inner free end of arm 64 supports a conventional rear view mirror 66.

Referring now to Figs. 3, 4 and 5, it will be noted that the panels 38 are of substantially greater vertical extent than the carriage 40 and cover plate 48. Panels 38 extend downwardly beyond the lower ends of carriage 40 and cover plate 48. At the same time, it will be observed that the cover plate 48 extends downwardly a short distance beyond the lower end of carriage 40. Thus, the lowermost screws 44 are secured in place to hold cover plate 48 in clamping relation with the panels 38 by means of tubular nuts 68. The adjacent vertical edges 70 of the two panels 38 are spaced apart and a slot 72 extends upwardly from the lower edge of cover plate 48 to approximately the lower end of carriage 40. The spaced apart edges 70 of panels 38 and slot 72 provide clearance for the arm 64 which forms the mirror support. With this arrangement, the cover plate 48 imparts substantial rigidity to the two panels 38 in a lateral direction and nevertheless enables the glare shield 24 to be shifted to the operative position shown in full lines in Fig. 1 wherein it overlies substantially the entire upper half portion of the windshield.

In the form of glare shield shown, each panel 38 is provided with a wing 74 at the outer end thereof which extends around and shields the side portions 76 of the windshield 16. In the case of an automobile provided with sloping front door pillars and wherein the windshield does not extend as far around the side of the automobile at each end, the wings 74 would be shorter.

The arrangement described herein is such that the glare shield can be shifted from the operative position shown by solid lines in Fig. 1 upwardly to the inoperative position shown in broken lines in Fig. 1 simply by grasping the handle 46 and sliding the whole assembly upwardly and rearwardly. In the inoperative position, the glare shield is substantially completely removed from the area of the windshield 16. Movement of the glare shield to and from the operative position is facilitated by the sliding connection between the shoe 50 of carriage 40 and the inturned flanges 54 of track 26. Spring 52 yieldably retains the glare shield in any position along track 26 to which it is adjusted.

The panels 38 are preferably formed from sheet plastic material of relatively light weight. Normally, such panels would have little stability as a unit in a lateral direction, since they are secured together and supported only at the central portion of the glare shield by means of the carriage 40 and cover plate 48. However, the channel re-enforcement 56 ties the panels 38 together, provides substantial lateral support, and maintains the lateral contour of the glare shield. The path of adjustment of the glare shield is substantially assisted, however, by two small rubber rollers 78 each of which is mounted in a bearing stand 80 fixed to the header structure at the upper edge of the windshield opening adjacent each end thereof by screws 82. The re-enforcing member 56 is preformed so that the panels 38 maintain pressure against and rolling contact with the rollers 78 as the glare shield is moved upwardly and downwardly along its arcuate path determined by the track 26.

Under normal conditions of driving where the surrounding light is not strong or harsh, the glare shield is retained in the inoperative position shown by broken lines in Fig. 1 where it extends substantially parallel to the headlining 18 and is substantially completely removed from the area of the windshield. When conditions of bright sunlight occur, the driver can, if he so desires, shift the glare shield to the operative position shown in solid lines in Fig. 1. With the glare shield in this position, the driver is enabled to see most of the view ahead through the lightly tinted glare shields. It will be observed that in the operative position of the glare shield, the upper edge thereof defined generally by the re-enforcing member 56 is located slightly above the upper edge of the windshield; and the cover plate 48 and carrier 40 close the gap between the adjacent edges 70 of the panels 38 along a major portion of their extent. During the early morning or late afternoon hours, the rays of the sun may impinge directly on the eyes of the driver through the lightly tinted glare shield; and under such conditions, the glare shield panels 38 may not be sufficient to protect the driver's eyes from the relatively small area of such direct rays. There is therefore provided an auxiliary shield 84 of tinted transparent material which is arranged to overlie one of the panels 38 to further reduce the light transmission at the small desired area. The auxiliary shield 84 is slidably mounted on the re-enforcing member 56 of the glare shield by metal brackets 86. Thus, the auxiliary shield 84 is adjustable laterally to a position wherein the driver's eyes are afforded the additional protection needed from the direct rays of the sun.

It will be observed from Fig. 1 that with the form of glare shield illustrated provided with the side wings 74, these side wings 74 may be designed so that in the inoperative position of the shield, shown in broken lines, these side wings will serve to shield sunlight through the glass panels 24 of the door at the area immediately to the rear of the pillars 20. This is desirable because when the sun is at the side of the car, there may be less need to maintain the glare shield in the operative lowered position. Under such conditions, it may be raised and thus utilized more for protection at each side of the car than at the front of the car.

It will be appreciated, of course, that although in the arrangement herein described, the carriage 40, panels 38 and cover plate 48 are fashioned as individual members, all of these members can be integrated into a one-piece glare shield, preferably of molded construction. Likewise, if desired, the re-enforcement member 56 may also be integrally molded with a one-piece glare shield panel by simply increasing the thickness of the edge portion of the panel.

Thus, it will be seen that I have provided a glare shield arrangement for an automobile which is of simple construction and still is easily adaptable to complex conditions in an automobile. The glare shield of this invention is designed to afford protection against strong light across substantially the entire upper half portion of the windshield. It is furthermore designed to be shifted readily and easily by the driver from an inoperative position extending generally parallel to the headlining of the automobile downwardly along the curved track 26 to a position wherein it extends generally parallel to the windshield of the vehicle. Furthermore, extremely simple friction means are provided for guiding the movement of the glare shield and for normally maintaining the glare shield in its position of adjustment. In addition, it will be appreciated that from the standpoint of tooling for manufacturing, economy is effected by designing the track and carriage assembly for use on most makes and models of automobiles and changing the design of only bracket 28 for adapting the glare shield to different groups of automobiles.

In other words, I have devised a new accessory for an automobile, a glare shield the support for which is located at the normal support for the conventional rear view mirror, a glare shield which slides upwardly and downwardly between the windshield and the driver, and a glare shield having a supporting track which also supports the rear view mirror.

I claim:

1. In an automobile provided with a windshield and a roof structure trimmed with a headlining, a glare shield comprising a transparent, tinted panel shaped to overlie generally the upper half portion of the windshield, a track mounted within the automobile and extending along a longitudinal central line forwardly over a portion of the headlining of the automobile and then in a direction downwardly over a portion of the inner face of the windshield from the upper edge therefor, said track being arcuate in a longitudinal direction such that when mounted on the automobile as described, it extends generally parallel to and is spaced inwardly of said headlining and said windshield, said panel being of corresponding arcuate shape in section and having means thereon engaged within and movable along said track for shifting said panel to an operative position at one end of the track and an inoperative position at the other end of the track, said last mentioned means maintaining said panel generally parallel to and spaced from said track throughout the extent of movement of the panel along the track, said panel also being generally arcuate in transverse section, a pair of rollers mounted on and depending from said roof structure adjacent the upper edge of the windshield and adjacent the opposite ends of said panel, said rollers contacting the upper or outer face of said panel adjacent each end thereof, said rollers cooperating with said means supporting the panel in the track to maintain the panel in an arcuate tensioned condition, whereby stability is imparted to the panel in a direction perpendicular to the plane thereof.

2. The combination called for in claim 1 wherein the rollers are positioned to engage the panel adjacent its front or lower edge when in the inoperative position and adjacent its rear or upper edge when in the operative position.

3. The combination called for in claim 1 wherein said panel is provided with a re-enforcement extending laterally across the upper edge thereof, said re-enforcement tending to yieldably bias said panel against said rollers.

4. In an automobile having a window and a roof structure, a glare shield panel shaped to overlie a portion of said window, a track supported on said roof structure adjacent the upper edge of said window and extending along said roof structure in a direction generally perpendicular to said edge of the window, said track being arcuate in a longitudinal direction such that it extends generally parallel to and is spaced inwardly of said roof structure, said panel having means thereon disposed generally medially between the ends thereof engaged with said track and movable therealong for supporting the panel on said track and for shifting the panel to an operative position at one end of the track and overlying a portion of said window and to an inoperative position at the other end of the track where the panel is disposed adjacent and generally parallel to the roof structure, means disposed between said roof structure and said panel for exerting pressure inwardly or downwardly from said roof structure against said panel at points spaced outwardly from and on opposite sides of said track for maintaining said panel in an arcuate tensioned condition in a direction transversely of the panel whereby stability is imparted to the panel in a direction perpendicular to the plane thereof.

5. The combination called for in claim 4 wherein said last mentioned means includes rolling elements for permitting the panel to be moved freely to said operative and inoperative positions.

6. The combination called for in claim 4 wherein said last mentioned means comprise a pair of rollers mounted on said roof structure and engaging the outer or upper face of said panel at points spaced outwardly from and on opposite sides of said track.

7. The combination called for in claim 4 wherein said arcuate track has one portion generally parallel to said roof structure and another portion generally parallel to said window.

8. The combination called for in claim 7 wherein said panel has an arcuate cross section corresponding generally to the arcuate shape of said track.

9. The combination with a vehicle having a transverse header and a transparent windshield extending forwardly and downwardly from the transverse header, of an adjustable, transparent, tinted, anti-glare shield panel of substantial rigidity and mounting therefor, comprising a track extending along a longitudinal central line of the vehicle, supported by the header and defining a path of movement for the anti-glare shield, means fixed upon the anti-glare shield panel engaging in said track and movable along said track to opposite ends of the track for shifting the anti-glare shield along said path and for disposing the anti-glare shield panel at operative and inoperative positions at opposite ends of said path, said anti-glare shield being adapted for movement in said path to an operative position at the rear face and in substantial parallelism with the windshield and for movement upwardly and rearwardly of the windshield to an inoperative position, and a pair of separate and spaced roller means, one each fixedly supported by the header at opposite ends of the header and projecting into the path of movement of the anti-glare shield panel and each said roller means having a relatively narrow rolling contact upon the upper face of the panel at the lateral edges of the panel for stabilizing the lateral edges of the panel and for imposing restraint on the panel against unintentional shifting of the panel.

10. The combination called for in claim 9 wherein the track is of channel shape having its longitudinal edges inturned to form spaced flanges, between which a longitudinally extending opening is provided, said opening being disposed along the lower portion of the track and providing a slot formation through which extends the means fixed upon the anti-glare shield panel for shiftably contacting upon the internal surface of the channel shaped track member.

*11. In an automobile having a window and a roof structure, a glare shield panel adapted to overlie a portion of said window, a track structure supported on said roof structure adjacent the upper edge of the window and extending along said roof structure in a direction generally perpendicular to said edge of the window, said track structure being spaced inwardly substantially from the opposite ends of the window, said track structure being arcuate in a longitudinal direction and extending generally parallel to and spaced inwardly of said roof structure, said panel having means thereon engaged with said track structure and movable therealong for supporting the panel on said track structure and for shifting the panel to an operative position at one end of the track structure and overlying a portion of said window and to an inoperative position at the other end of said track structure where the panel is disposed adjacent and generally parallel to the roof structure, means disposed between said roof structure and said panel for exerting pressure inwardly or downwardly from said roof structure against said panel at points spaced outwardly from said track structure and adjacent the opposite ends of said panel for maintaining said panel in an arcuate tensioned condition in a direction transversely of the panel whereby stability is imparted to the panel in a direction perpendicular to the plane thereof.*

*12. The combination called for in claim 11 wherein said last mentioned means comprise rolling elements*

*engaging the top or back side of the panel for permitting the panel to be moved freely to said operative and inoperative positions.*

*13. The combination with a vehicle having a transverse header and a transparent windshield extending forwardly and downwardly from said header, of an adjustable glare shield panel of substantial rigidity and a mounting for said glare shield panel comprising a track means extending longitudinally of the vehicle supported by the header and defining a path of movement for the glare shield, means fixed on said glare shield panel engaging in said track means and movable therealong to opposite ends of the track means for shifting the glare shield panel along said path and for disposing the glare shield panel at an operative position at the rear face of and in general parallelism with the windshield and at an inoperative position located rearwardly and upwardly from said operative position, and a pair of separate and spaced roller means, one each fixedly supported by the header at opposite ends of the header and projecting into the path of movement of the glare shield panel, each of said rollers having a relatively narrow rolling contact*

*with the upper or back face of the panel adjacent the lateral edges of the panel for stabilizing the lateral edges of the panel and for imposing restraint on the panel against unintentional shifting of the panel.*

References Cited in the file of this patent or the original patent

UNITED STATES PATENTS

| | | |
|---|---|---|
| 1,498,572 | Patterson | June 24, 1924 |
| 1,750,888 | Harrold | Mar. 18 1930 |
| 1,790,965 | Wyatt | Feb. 3, 1931 |
| 1,864,943 | Riddle | June 28, 1932 |
| 2,102,454 | Bennett | Dec. 14, 1937 |
| 2,252,715 | Levy | Aug. 19, 1941 |
| 2,289,644 | Gano | July 14, 1942 |
| 2,458,918 | Rea | Jan. 11, 1949 |
| 2,526,889 | McComb | Oct. 24, 1950 |
| 2,556,950 | Walker | June 12, 1951 |

FOREIGN PATENTS

| | | |
|---|---|---|
| 52,890 | Denmark | Mar. 30, 1937 |